(12) United States Patent
Osakabe

(10) Patent No.: US 8,610,975 B2
(45) Date of Patent: Dec. 17, 2013

(54) IMAGE SCANNING DEVICE

(75) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 57 days.

(21) Appl. No.: 13/417,356

(22) Filed: Mar. 12, 2012

(65) Prior Publication Data
US 2013/0083372 A1    Apr. 4, 2013

(30) Foreign Application Priority Data
Sep. 30, 2011  (JP) ................................. 2011-218077

(51) Int. Cl.
*H04N 1/04*  (2006.01)

(52) U.S. Cl.
USPC ............................ 358/498; 358/474; 358/475

(58) Field of Classification Search
USPC .................. 358/474, 488, 448, 498, 501, 475
See application file for complete search history.

(56) References Cited

U.S. PATENT DOCUMENTS

| | | | | |
|---|---|---|---|---|
| 5,988,817 | A * | 11/1999 | Mizushima et al. | 353/94 |
| 7,342,693 | B2 * | 3/2008 | Morisaki | 358/496 |
| 7,911,658 | B2 * | 3/2011 | Yamamoto | 358/474 |
| 7,957,034 | B2 * | 6/2011 | Ueda et al. | 358/3.28 |
| 8,035,864 | B2 * | 10/2011 | Nakai et al. | 358/448 |
| 8,199,373 | B2 * | 6/2012 | Ito | 358/474 |
| 8,274,711 | B2 * | 9/2012 | Hiro | 358/474 |
| 8,305,684 | B2 * | 11/2012 | Mizuta | 359/372 |
| 8,358,449 | B2 * | 1/2013 | Seo | 358/474 |
| 8,427,718 | B2 * | 4/2013 | Omoya | 358/475 |
| 8,462,393 | B2 * | 6/2013 | Kohara et al. | 358/446 |

FOREIGN PATENT DOCUMENTS

| | | |
|---|---|---|
| JP | 2001-197232 | 7/2001 |
| JP | 2004-154975 | 6/2004 |
| JP | 2006-084569 | 3/2006 |
| JP | 2010-282077 | 12/2010 |

* cited by examiner

*Primary Examiner* — Negussie Worku
(74) *Attorney, Agent, or Firm* — Banner & Witcoff, Ltd.

(57) ABSTRACT

An image scanning device includes a main unit, a scanning unit movable relative to the main unit between its base position and its moved position, a document conveying unit movable relative to the scanning unit between its base position and its moved position, a cover member movable relative to the document conveying unit between its base position and its moved position, and first and second detectors. The first second detectors output four different combinations of on/off signals which include a first combination output in a base state where all the units are in their base positions, a second combination output when the scanning unit moves to its moved position from the base state, a third combination output when the document conveying unit moves to its moved position from the base state, and a fourth combination output when the cover member moves to its moved position from the base state.

15 Claims, 10 Drawing Sheets

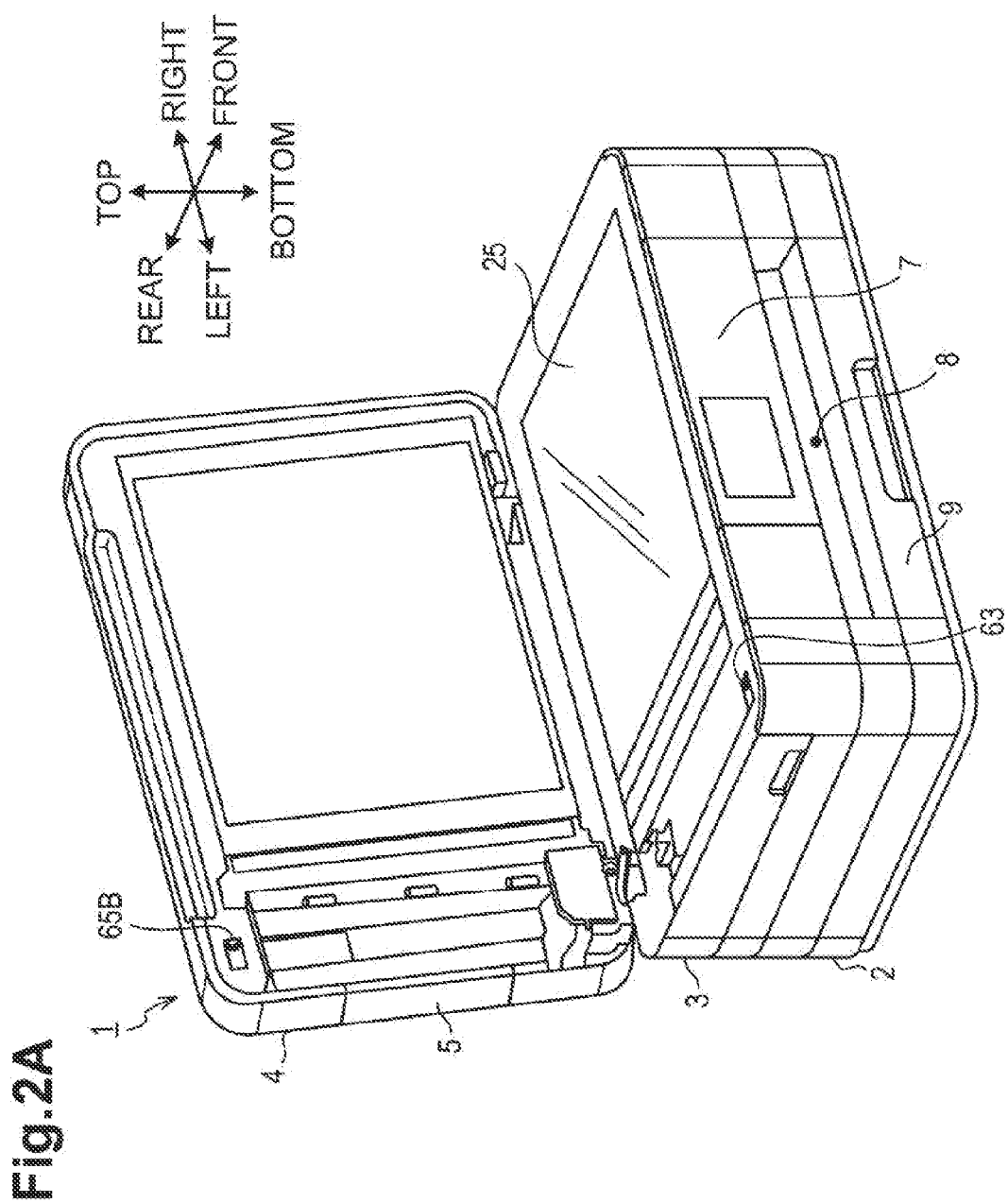

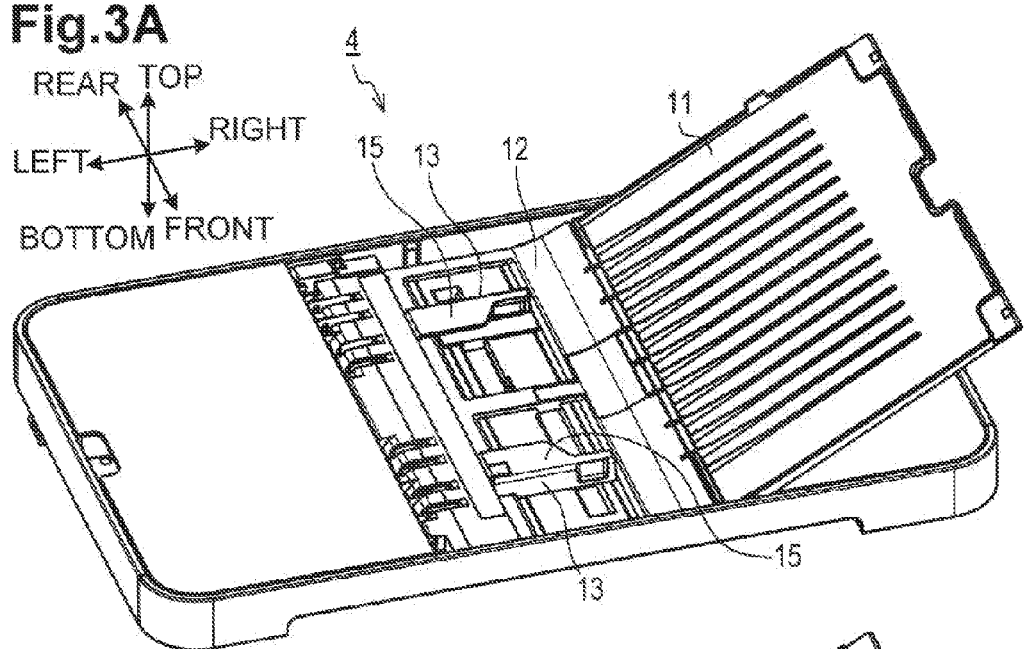
Fig.3A
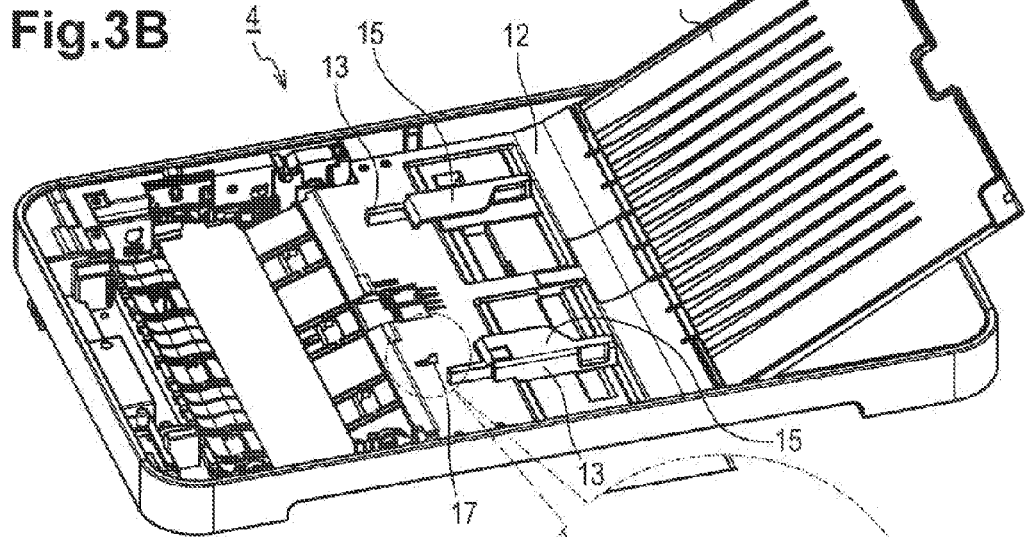
Fig.3B
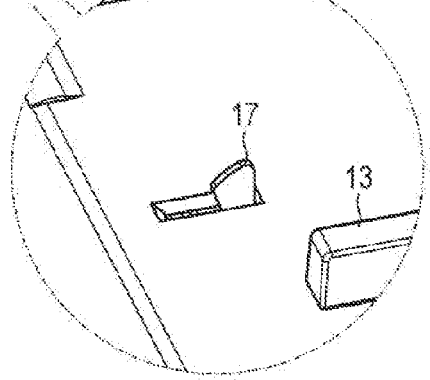

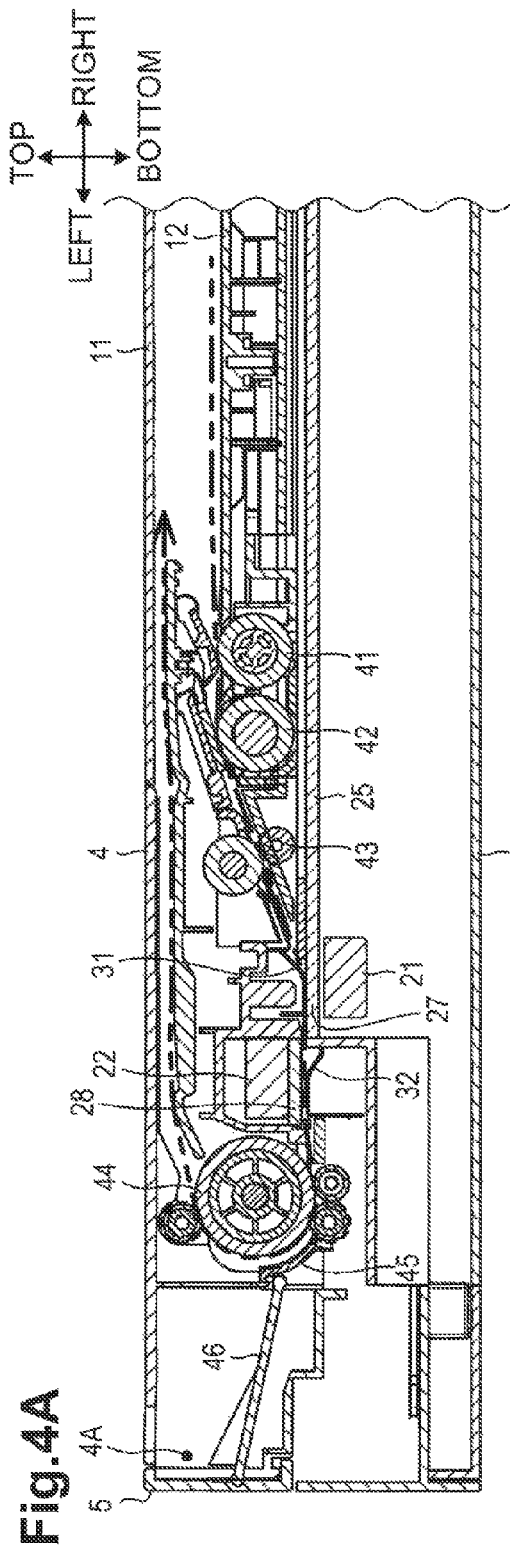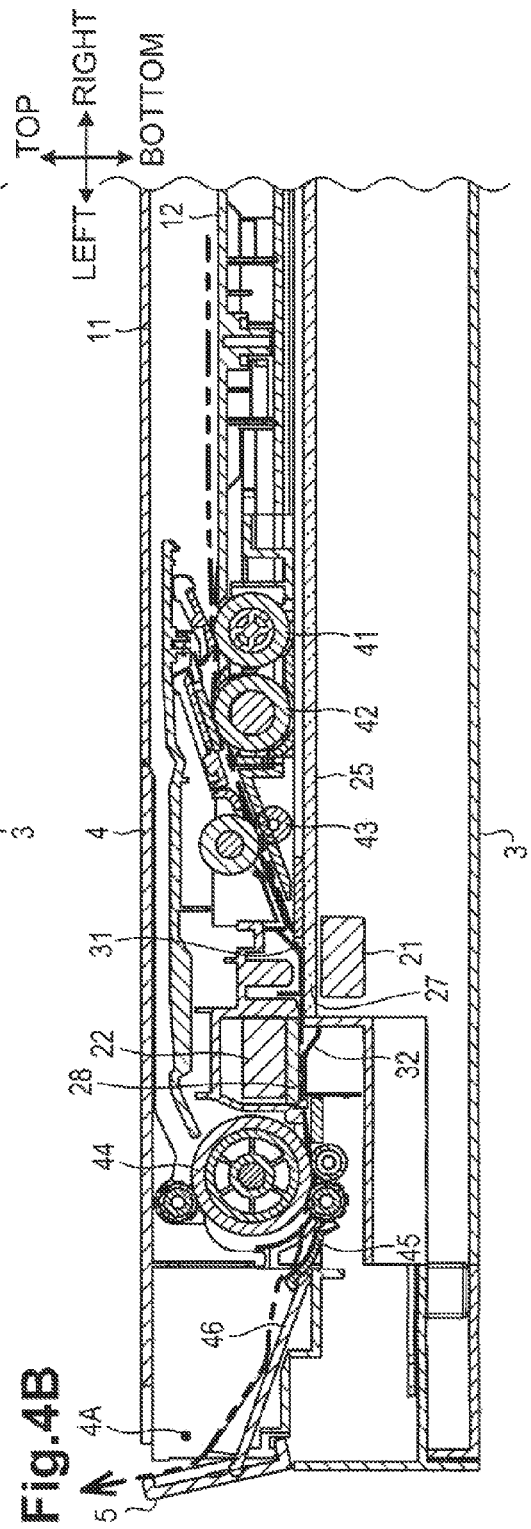

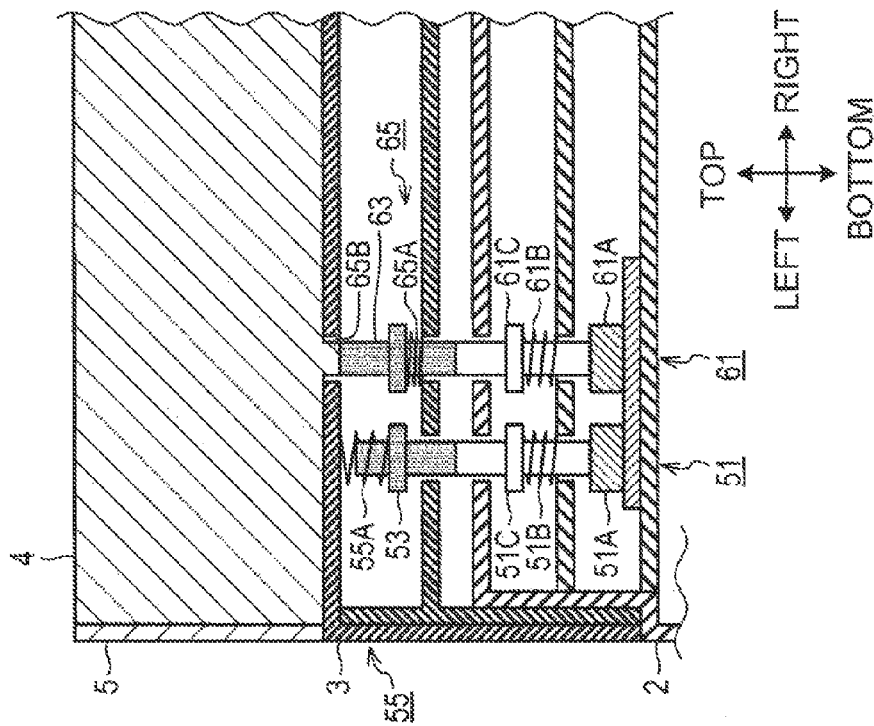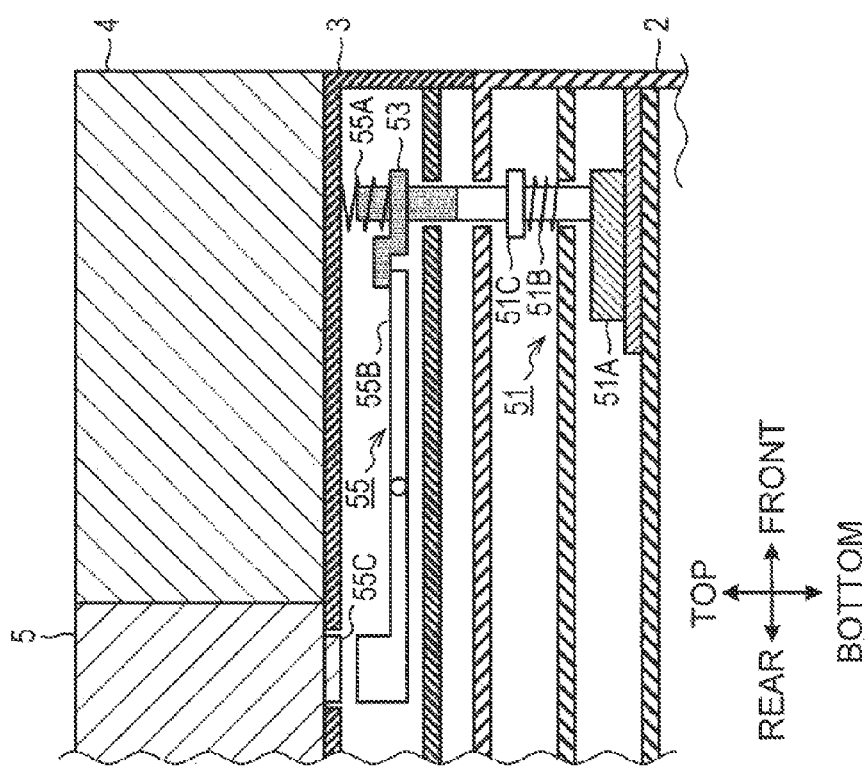

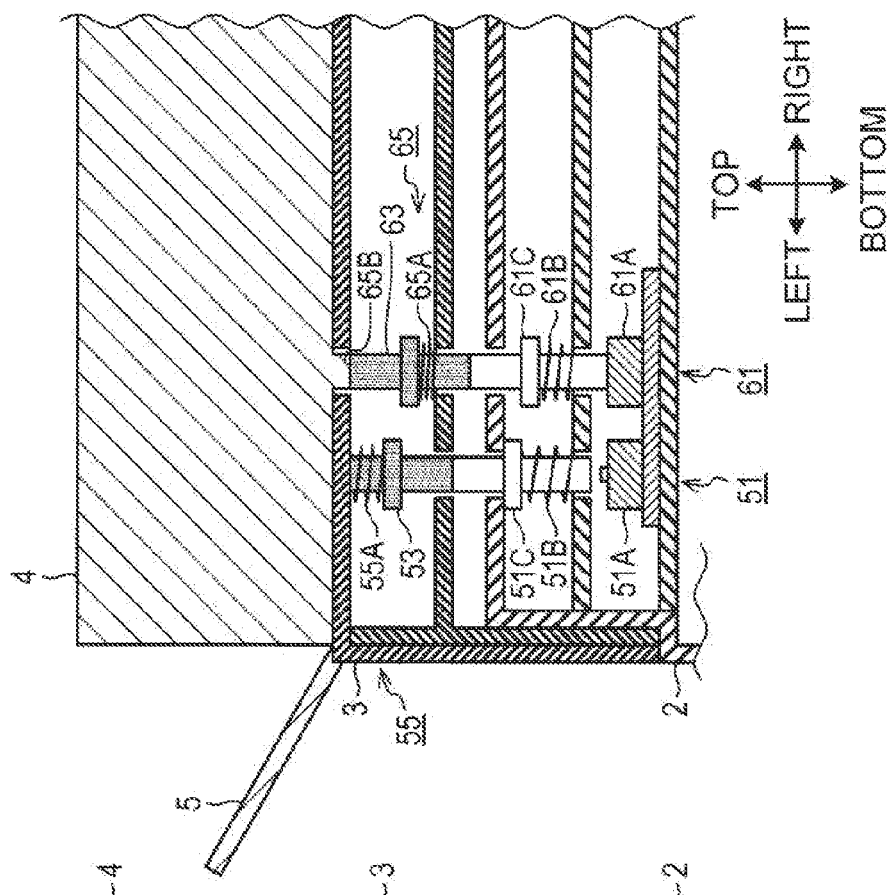
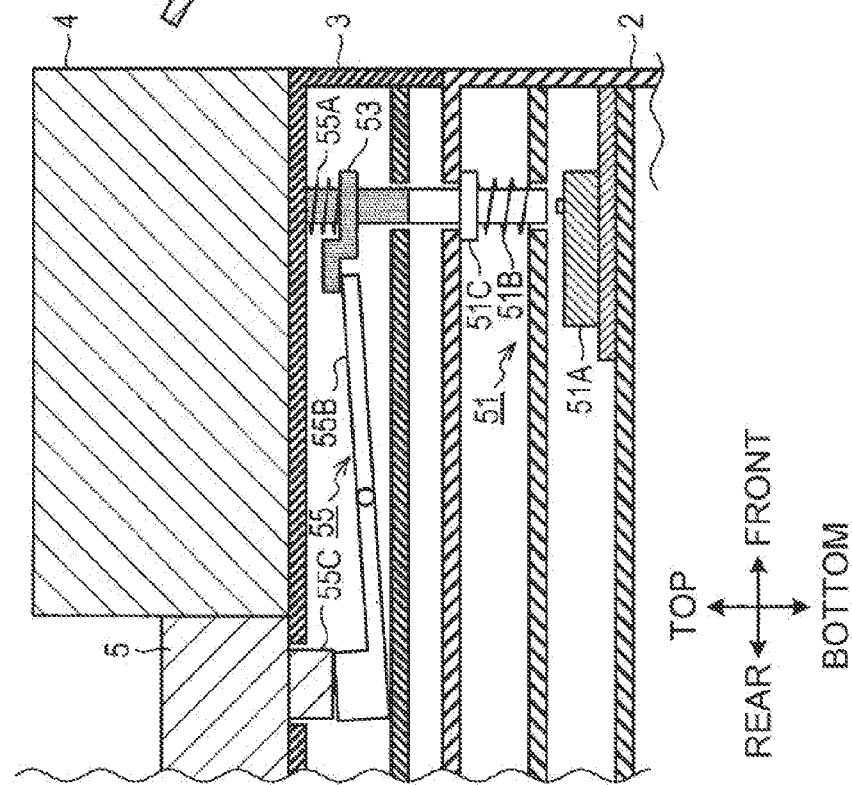
Fig. 6A
Fig. 6B

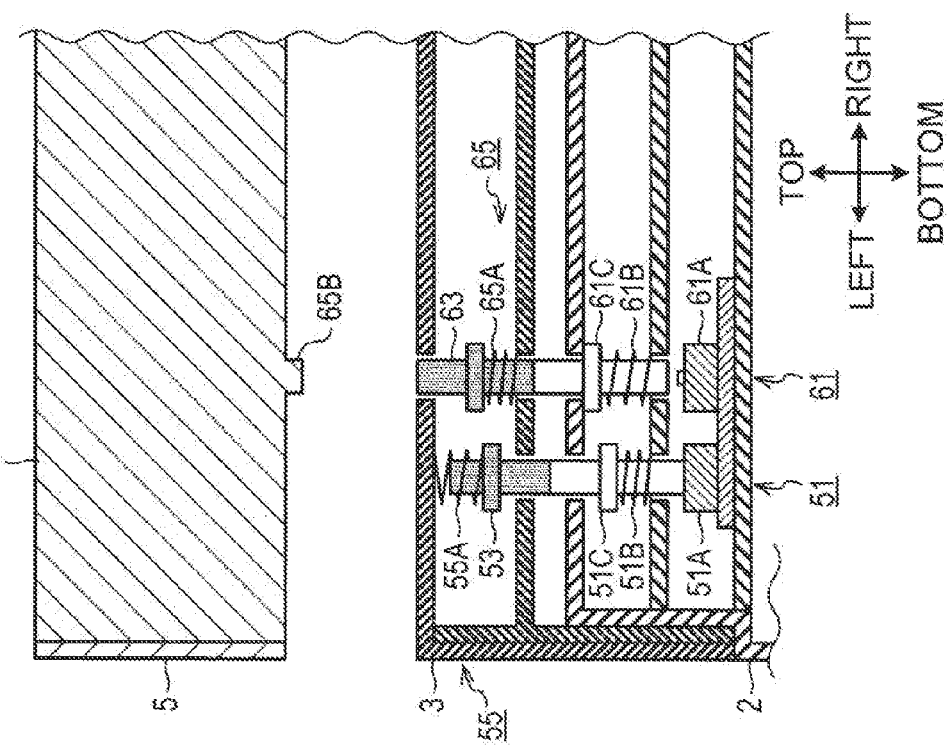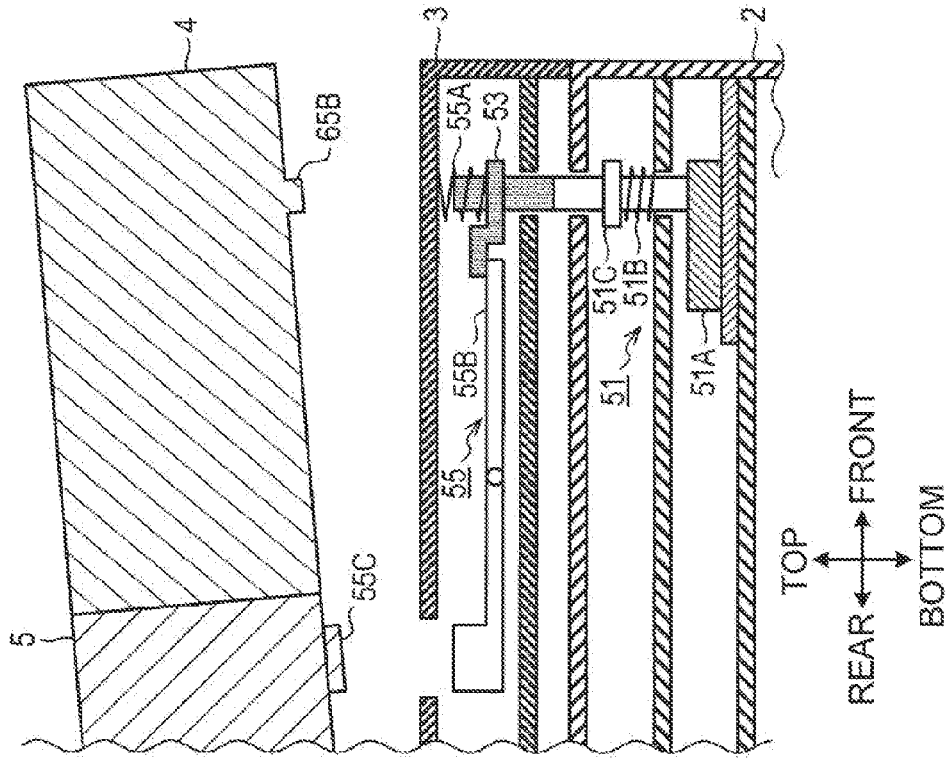

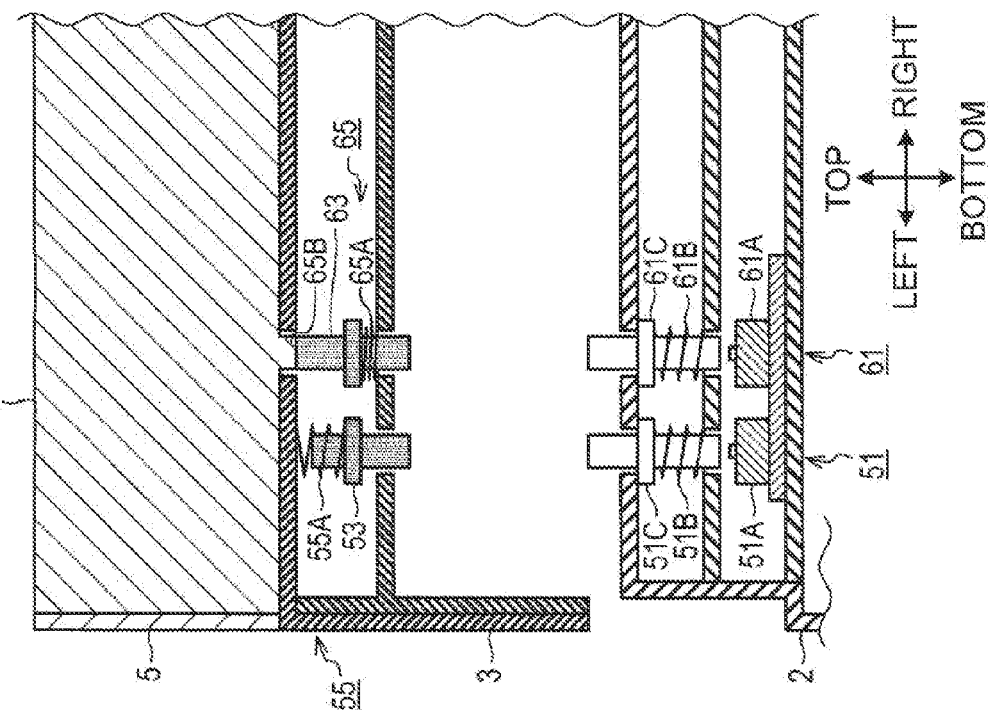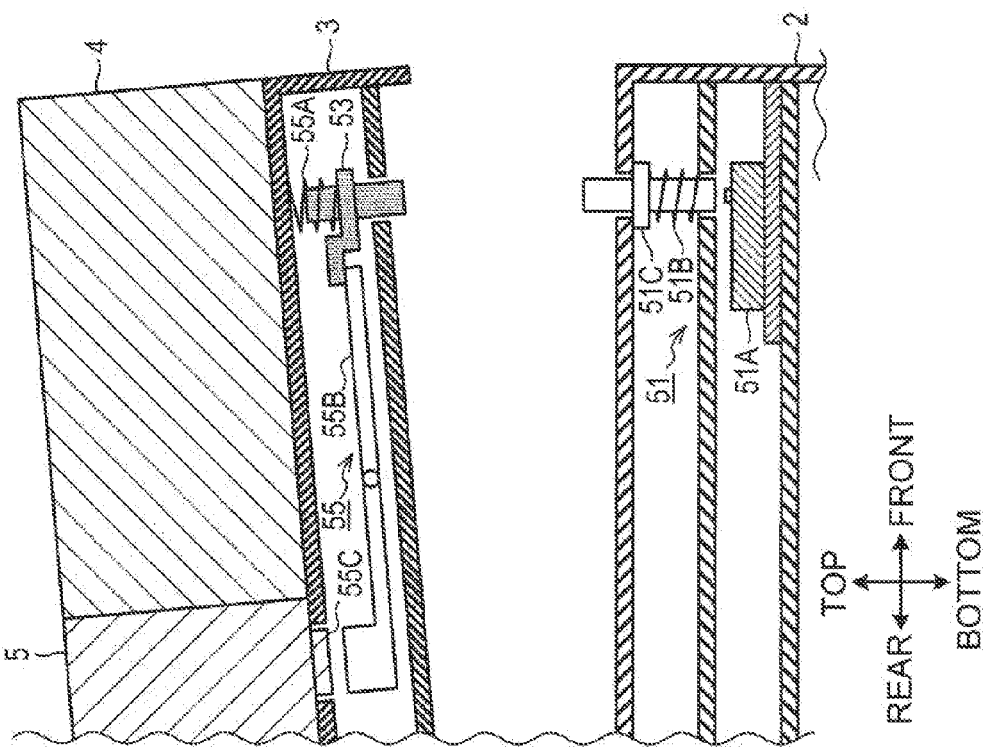

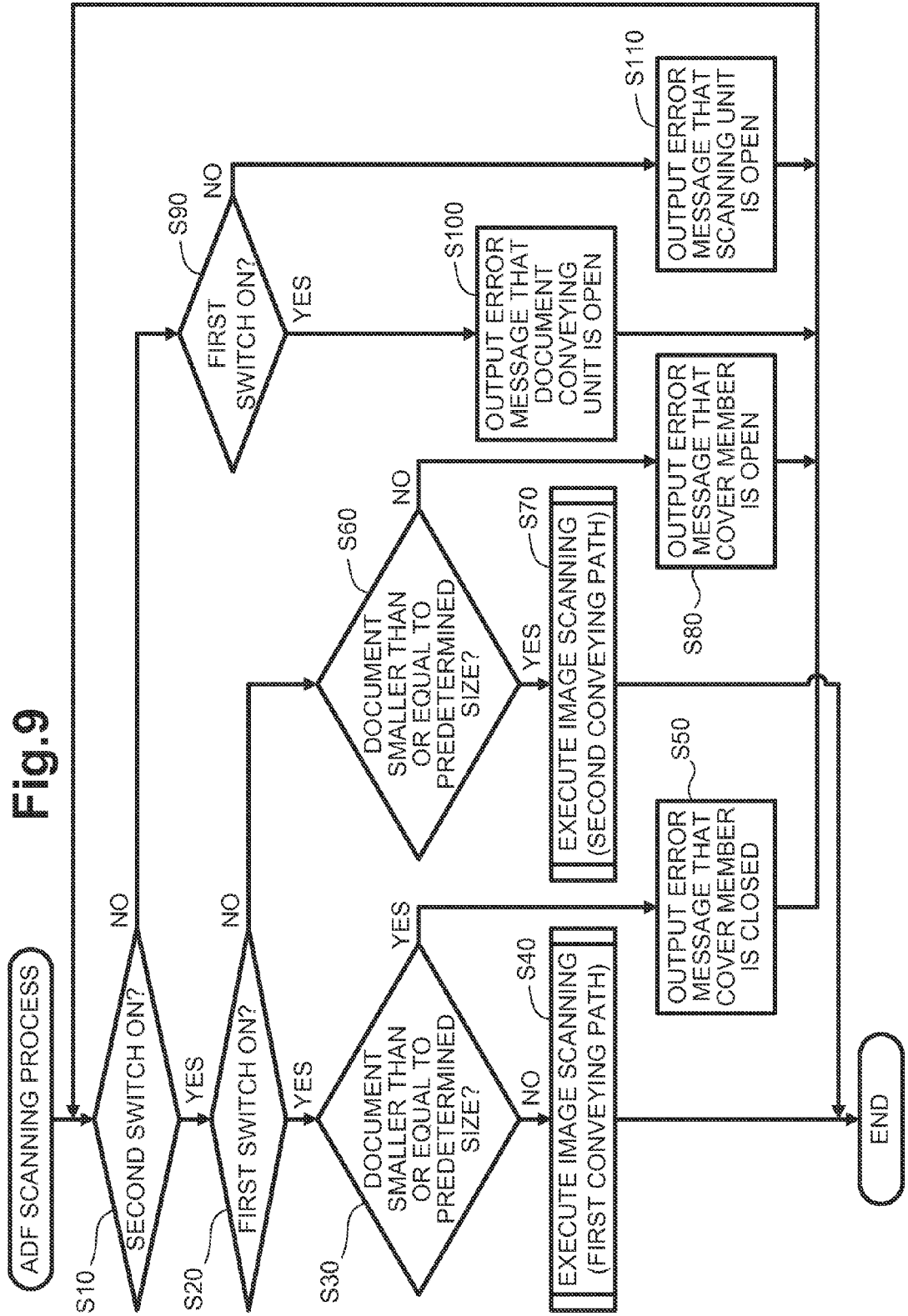

IMAGE SCANNING DEVICE

CROSS REFERENCE TO RELATED APPLICATION

This application claims priority from Japanese Patent Application No. 2011-218077, filed on Sep. 30, 2011, the entire disclosure of which is incorporated herein by reference.

BACKGROUND OF THE INVENTION

1. Field of the Invention

The present invention relates to an image scanning device.

2. Description of Related Art

A known multi-function device comprises a main unit comprising an image forming mechanism, and a scanning unit mounted on the main unit and comprising an image scanning mechanism. The multi-function device further comprises a document conveying unit disposed at the top of the scanning unit and comprising an automatic document feeder (hereinafter referred to as ADF).

In such a multi-function device, the document conveying unit is configured to be opened/closed relative to the scanning unit. The document conveying unit is opened to use a document holder disposed at the top of the scanning unit, and is closed to use the ADF. In a case where the scanning unit is configured to be opened/closed relative to the main unit, the scanning unit is usually closed and is opened to enable maintenance of the image forming mechanism. Further, there is a case where other portions are configured to be opened/closed.

SUMMARY OF THE INVENTION

A need has arisen for an image scanning device that comprises at least three movable/openable portions, and detectors configured to individually detect positions of the movable/openable portions while the total number of detectors remains less than the total number of movable/openable portions.

According to an embodiment of the invention, an image scanning device comprises a main unit, a scanning unit comprising a document holding surface and configured to scan a document held on the document holding surface and to move relative to the main unit between a first base position and a first moved position, a document conveying unit configured to covey the document to be scanned by the scanning unit and to move relative to the scanning unit between a second base position and a second moved position, a cover member configured to move relative to the document conveying unit between a third base position and a third moved position, a first detector configured to output an on/off signal, and a second detector configured to output an on/off signal. The first detector and the second detector are configured to output four different combinations of on/off signals. A first combination of on/off signals is output when the scanning unit, the documents conveying unit, and the cover member are in the first base position, the second base position, and the third base position, respectively. A second combination of on/off signals is output when the scanning unit moves from the first base position to the first moved position while the document conveying unit and the cover member are in the second base position and the third base position, respectively. A third combination of on/off signals is output when the document conveying unit moves from the second base position to the second moved position while the scanning unit and the cover member are in the first base position and the third base position, respectively. A fourth combination of on/off signals is output when the cover member moves from the third base position to the third moved position while the scanning unit and the document conveying unit are in the first base position and the second base position, respectively.

According to another embodiment of the invention, an image scanning device comprises a main unit, a scanning unit comprising a document holding surface and configured to scan a document held on the document holding surface and to move relative to the main unit between a first base position and a first moved position, a document conveying unit configured to covey the document to be scanned by the scanning unit and to move relative to the scanning unit between a second base position and a second moved position, a path switching member configured to guide the document conveyed by the document conveying unit and to move between a first position for guiding the document along a first path and a second position for guiding the document along a second path, a first detector configured to output an on/off signal, and a second detector configured to output an on/off signal. The first detector and the second detector are configured to output four different combinations of on/off signals. A first combination of on/off signals is output when the scanning unit, the document conveying unit, and the path switching member are in the first base position, the second base position, and the first position, respectively. A second combination of on/off signals is output when the scanning unit moves from the first base position to the first moved position while the document conveying unit and the path switching member are in the second base position and the first position, respectively. A third combination of on/off signals is output when the document conveying unit moves from the second base position to the second moved position while the scanning unit and the path switching member are in the first base position and the first position, respectively. A fourth combination of on/off signals is output when the path switching member moves from the first position to the second position while the scanning unit and the document conveying unit are in the first base position and the second base position, respectively.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

FIG. 2A is a perspective view of the multi-function device in a third open/closed state.

FIG. 3A is a perspective view of a document conveying unit in which a top cover thereof is open.

FIG. 3B is a perspective view of the document conveying unit comprising a document sensor.

FIG. 4A is a vertical cross-sectional view of the multi-function device comprising a scanning unit and the document conveying unit, as viewed from the front and in a state where a cover member is closed.

FIG. 4B is a vertical cross-sectional view off the multi-function device comprising the scanning unit and the document conveying unit, as viewed from the front and in a state where the cover member is open.

FIG. 5A is a vertical cross-sectional view of a part of the multi-function device in the first open/closed state, showing a first detector as viewed from the left side of the multi-function device.

FIG. 5B is a vertical cross-sectional view of a part of the multi-function device in the first open/closed state, showing the first detector and a second sensor as viewed from the front of the multi-function device.

FIG. 6A is a vertical cross-sectional view of a part of the multi-function device in the second open/closed state, showing the first detector as viewed from the left side of the multi-function device.

FIG. 6B is a vertical cross-sectional view of a part of the multi-function device in the second open/closed state, showing the first detector and the second detector as viewed from the front of the multi-function device.

FIG. 7A is a vertical cross-sectional view of a part of the multi-function device in the third open/closed state, showing the first detector as viewed from the left side of the multi-function device.

FIG. 7B is a vertical cross-sectional view of a part of the multi-function device in the third open/closed state, showing the first detector and the second detector as viewed from the front of the multi-function device.

FIG. 8A is a vertical cross-sectional view of a part of the multi-function device in the fourth open/closed state, showing the first detector as viewed from the left side of the multi-function device.

FIG. 8B is a vertical cross-sectional view of a part of the multi-function device in the fourth open/closed state, showing the first detector and the second detector as viewed from the front of the multi-function device.

FIG. 9 is a flowchart showing an example of control executed in the multi-function device, according to the open/closed states of the multi-function device.

DETAILED DESCRIPTION OF EMBODIMENTS

Figure 1A:
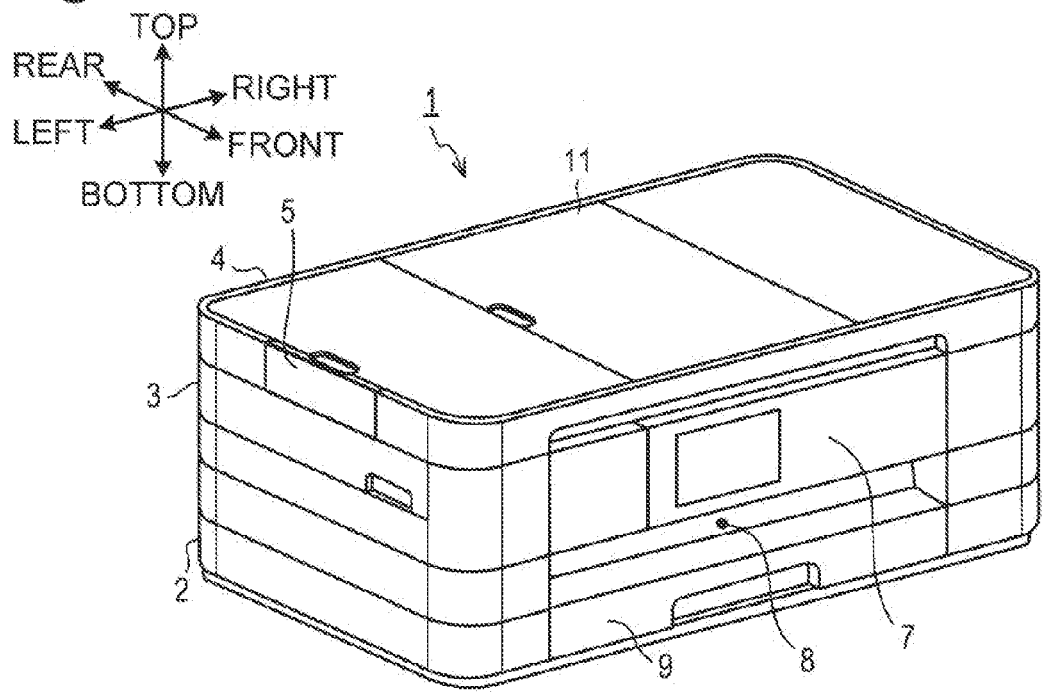
FIG. 1A is a perspective view of a multi-function device in a first open/closed state, according to an embodiment of the invention.

Embodiments of the invention and their features and technical advantages may be understood by referring to FIGS. 1-9, like numerals being used for like corresponding parts in the various drawings.

An image scanning device according to an embodiment of the invention may be a multi-function device having a scanning function and other functions, e.g., printing, copying, and facsimile transmitting/receiving functions. In the following description, the directions "top", "bottom", "left", "right", "front", and "rear" are used to clarify the positional relationship of various parts of the multi-function device.

As shown in FIGS. 1A, 1B, 2A, and 2B, a multi-function device 1 comprises a main unit 2, a scanning unit 3 mounted on the main unit 2, and a document conveying unit 4 mounted on the scanning unit 3.

The main unit 2 comprises therein an image forming unit, a control unit, and a power supply unit. The control unit of the main unit 2 controls various mechanisms of the main unit 2, the scanning unit 3, and the document conveying unit.

The scanning unit 3 is configured to pivot relative to the main unit 2 about an axis located in the vicinity of rear ends of the main unit 2 and the scanning unit 3 and extending in a left-right direction. The scanning unit 3 pivots between a first base position, e.g., a closed position (shown in FIG. 1A) and a first moved position, e.g., an open position (shown in FIG. 2B).

When the scanning unit 3 is in the open position, a first opening 2A defined at the top of the main unit 2 is open to allow maintenance work of the various parts, e.g., the image forming unit, the control unit, and the power supply unit. When the scanning unit 3 is in the closed position, the first opening 2A is closed.

The document conveying unit 4 is configured to pivot relative to the scanning unit 3 about an axis located near rear ends of the scanning unit 3 and the document conveying unit 4 and extending in the left-right direction. The document conveying unit 4 pivots between a second base position, e.g., a closed position (shown in FIG. 1A) and a second moved position, e.g., an open position (shown in FIG. 2A).

When the document conveying unit 4 is in the open position, a document holding surface (a transparent portion 25 for a stationary document) is exposed. The document conveying unit 4 located in the open position functions as a cover that covers the document holding surface.

A cover member 5 is attached to a left end of the document conveying unit 4. The cover member 5 is configured to pivot relative to the document conveying unit 4 about an axis located in the vicinity of a left end of the document conveying unit 4 and a lower end of the cover member 5. The cover member 5 pivots between a third base position, e.g., a closed position (shown in FIG. 1A) and a third moved position, e.g., an open position (shown in FIG. 1B).

When the cover member 5 is in the open position, a second opening 4A is open. When the cover member 5 is in the closed position, the second opening 4A is closed. As will be described later, when a document is conveyed along a second conveying path, the second opening 4A is used as a discharge port through which the document is discharged.

An operation panel 7 is disposed at a front top of the main unit 2 so as to be operated by a user. A discharge port 8 is formed below the operation panel 7 such that a recording medium having an image printed thereon is discharged through the discharge port 8. A cassette 9 configured to store blank recording media is mounted below the discharge port 8.

Figure 1B:
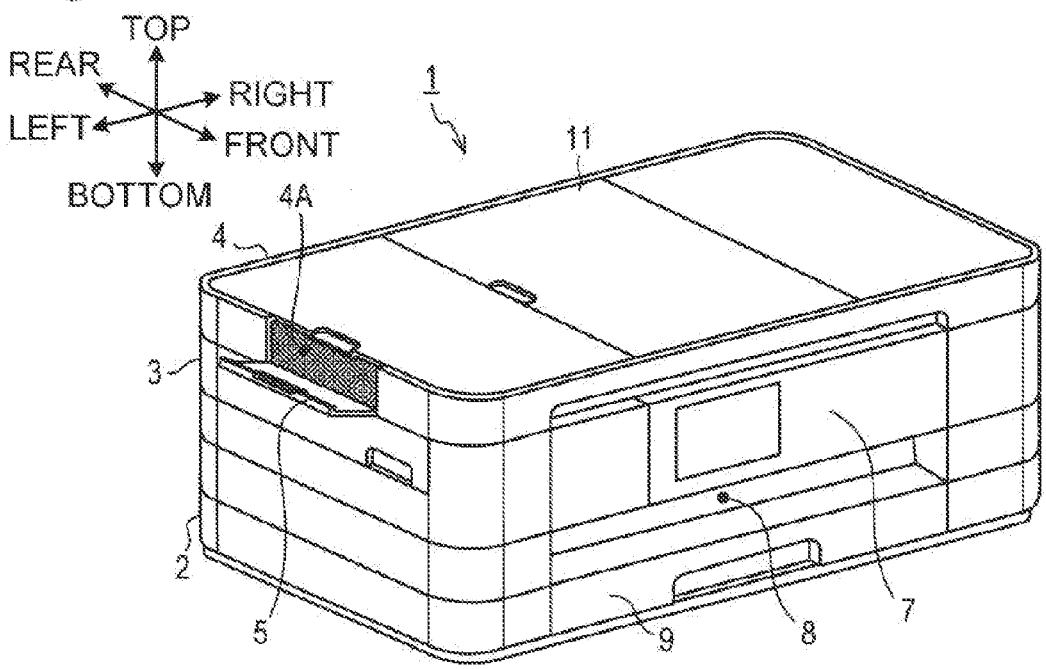
FIG. 1B is a perspective view of the multi-function device in a second open/closed state.
Figure 2B:
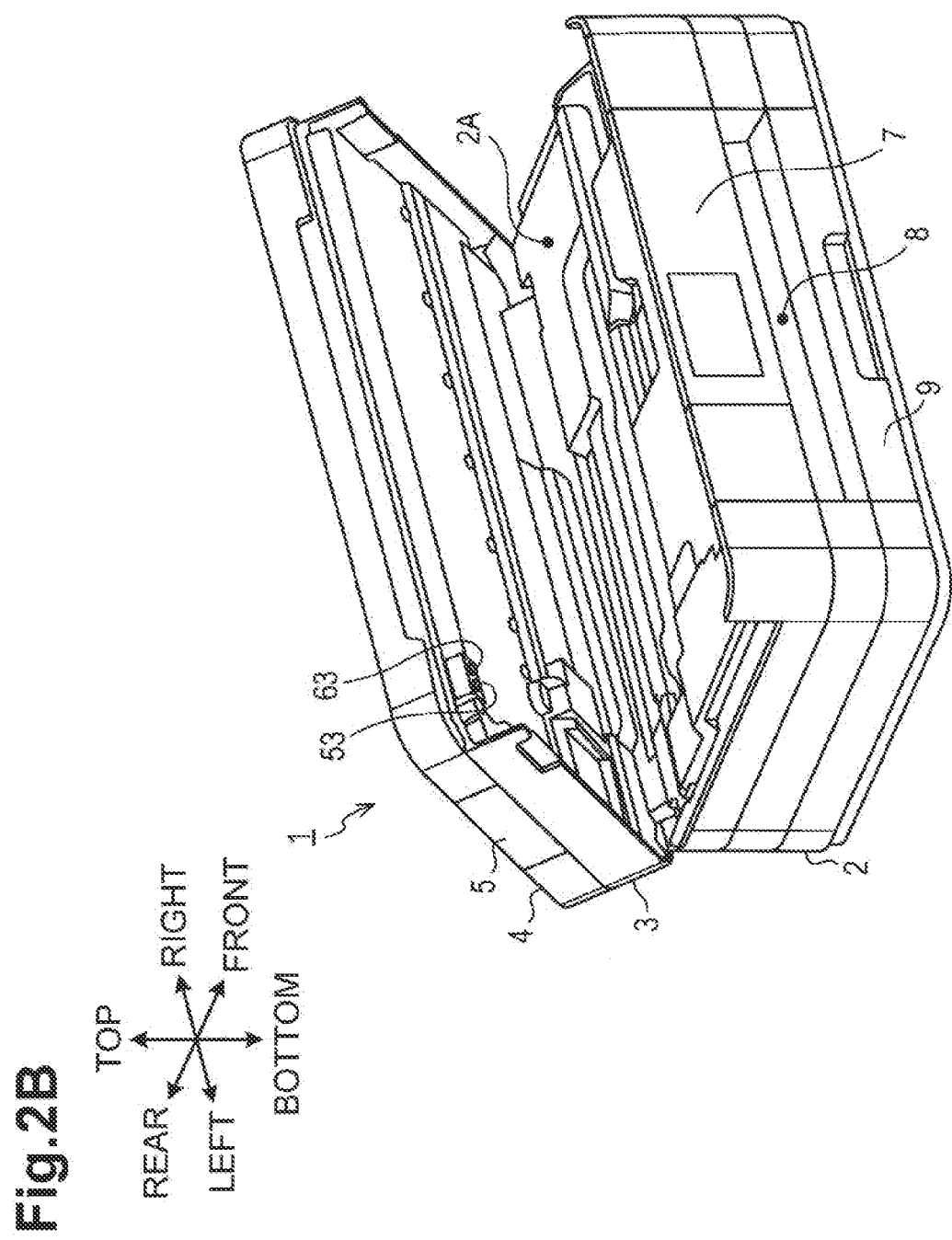
FIG. 2B is a perspective view of the multi-function device in a fourth open/closed state.

As shown in FIGS. 1A and 1B, an openable top cover 11 is disposed at the top of the sheet conveying unit 4. As shown in FIG. 3A, the top cover 11 is configured to pivot relative to the document conveying unit 4 about an axis located in the vicinity of a right end of the top cover 11 and extending in a front-rear direction. The top cover 11 pivots between a closed position (shown in FIG. 1A) and an open position (shown in FIG. 3A).

When the top cover 11 is in the closed position, a back surface of the top cover 11 faces down. When the top cover 11 is in the open position, the back surface of the top cover 11 faces diagonally up and a document holder 12 is formed at the top of the document conveying unit 4.

Document guides 13 are disposed on the document holder 12. The document guides 13 are configured to slide along the front-rear direction such that when one of the documents guides 13 slides in one direction, the other slides in an opposite direction. By operating only one of the document guides 13, the document guides 13 slide close to or away from each other thereby change a distance between the document guides 13.

A partition plate 14 is disposed at a top end of each document guide 13. Documents to be conveyed are set below the partition plates 15. As will be described later, when documents are conveyed along a first conveying path, the documents are discharged on and above the partition plates 15.

As shown in FIG. 3B, a document sensor 17 is disposed on the document holder 12. The document sensor 17 is a contact-type sensor and turns on/off by being pushed down by a document set in the document holder 12. The document sensor 17 is disposed at such a position that a document larger than a predetermined size (e.g., a postcard size) pushes down the document sensor 17. Thus, when a document (e.g., a postcard or a business card) smaller than or equal to the predetermined size is set in the document holder 12, the document sensor 17 is not pushed down and thereby detects whether the set document is smaller than or equal to the predetermined size.

As shown in FIGS. 4A and 4B, the scanning unit 3 comprises a first image sensor 21, and the document conveying unit 4 comprises a second image sensor 22. In this embodiment, each of the first image sensor 21 and the second image sensor 22 is a contact image sensor.

The first image sensor 21 is driven by a motor (not shown) to reciprocate inside the scanning unit 3 in the left-right direction (sub-scanning direction). The second image sensor 22 is fixed to a frame inside the document conveying unit 4.

The scanning unit 3 comprises a transparent portion 25 for a stationary document and a first transparent portion 27 for a moving document that are disposed above a reciprocating path of the first image sensor 21. The document conveying unit 4 comprises a second transparent portion 28 disposed below the second image sensor 22.

The transparent portion 25 and the first transparent portion 27 define a top surface of the scanning unit 3 and are formed by a single glass plate in this embodiment. The second transparent portion 28 is formed by a separate glass plate from the single glass plate having the transparent portion 25 and the first transparent portion 27.

The transparent portion 25 and the first transparent portion 27 may be formed by separate glass plates. The transparent portion 25, the first transparent portion 27, and the second transparent portion 28 may be made of other materials than glass as long as the material is transparent and allows the first image sensor 21 and the second image sensor 22 to scan a document therethrough.

The document conveying unit 4 comprises a first document retainer 31 disposed above the first transparent portion 27. The scanning unit 3 comprises a second document retainer 32 disposed below the second transparent portion 28.

The first document retainer 31 is urged downward by a compressed spring (not shown) so as to slightly press an upper surface of the first transparent portion 27. The second retainer 32 is urged upward by a compressed spring (not shown) so as to slightly press a lower surface of the second transparent portion 28.

The document conveying unit 4 comprises rollers, e.g., a feed roller 41, a separation roller 42, a registration roller 43, and a U-turn roller 44, and guide members disposed between these rollers and having guide surfaces for guiding a document in a predetermined direction. As one of the guide members, a movable path switching member 45 is disposed leftward of the U-turn roller 44.

The path switching member 45 is configured to pivot relative to the document conveying unit 4 about an axis located at a lower end of the path switching member 45 and extending in the front-rear direction. The path switching unit 45 pivots between a first position shown in FIG. 4A and a second position shown in a second position shown in FIG. 4B.

A link member 46 is disposed between the path switching member 45 and the cover member 5. The link member 46 is pivotably coupled, at a right end thereof, to the path switching member 45 and is pivotably coupled, at a left end thereof, to the cover member 5. Each of the cover member 45 and the path switching member 45 is configured to pivot, at a lower end thereof, relative to the document conveying unit 4. A four-joint link is formed in the document conveying unit 4 by the cover member 5, the path switching member 45, and the link member 46.

Because of this four joint link, the path switching member 45 moves to the second position as the cover member is opened, and moves to the first position as the cover member 5 is closed.

The multi-function device 1 having the above-described structure is configured to scan an image on a document while conveying the document by the document conveying unit 4. In order for the multi-function device 1 to scan a document, the cover member 5, the path switching member 45, and the link member 5 are moved to switch the path switching path to a desired conveying path.

Specifically, in this embodiment, when a document larger than a predetermined size (e.g., a postcard size) is conveyed, the path switching member 45 is moved to the first position for guiding the document along a first conveying path (shown by a two-dot-one-dash line in FIG. 4A). When a document (e.g., a postcard or a business card) smaller than or equal to the predetermined size (e.g., a postcard size) is conveyed, the path switching member 45 is moved to the second position for guiding the document along a second conveying path (shown by a two-dot-one-dash line in FIG. 4B).

A document to be conveyed is set on the document holder 12, and a scanning command is input to the multi-function device 1 through the operation panel 7 or remotely from a personal computer (not shown). At this time, either a single-side scanning mode or a double-side scanning mode is selectively designated.

When a scanning command is input to the multi-function device 1, the multi-function device 1 executes initialization of each device and then activates the rollers of the document conveying unit 4. At this time, the feed roller 41 feeds documents from an upstream side in a conveying direction, and the separation roller 42 separates and conveys the documents one by one toward a downstream side in the conveying direction.

A leading edge of the separated document is abut against the registration roller 43 such that the leading edge of the document is registered and skew of the document is corrected. The document is conveyed toward the downstream side in the conveying direction and passes between the first transparent portion 27 and the first document retainer 31. When the double-side scanning mode is designated or when the single-side scanning mode by the first image sensor 21 is designated, the first image sensor 21 scans an image of the document that reaches a position facing the first image sensor 21.

Specifically, the first image sensor 21 scans an image of a front side of the document by repeatedly scanning a plurality of pixels arranged on the document in a main scanning direction parallel to the front-rear direction of the multifunction device while the document moves in a sub-scanning direction parallel to the conveying direction.

The document having passed between the first transparent member 27 and the first document retainer 31 passes between the second transparent portion 28 and the second document retainer 32. When the double-side scanning mode is designated or when the single-side scanning mode by the second image sensor 22 is designated, the second image sensor 22 scans an image of the document that reaches a position facing the second image sensor 22.

Specifically, the second image sensor 22 scans an image of a back side of the document by repeatedly scanning a plurality of pixels arranged on the document in the main scanning direction while the document moves in the sub-scanning direction.

The document having passed between the second transparent portion 28 and the second document retainer 32 reaches to the U-turn roller 44 and is conveyed leftward from a lower end of the U-turn roller 44.

When the first conveying path is selected (as shown in FIG. 4A) as the document conveying path, the path switching member 45 serves as a partition wall that defines a space each on right and left sides of the path switching member 45. A concave right surface of the path switching member 45 is located along an outer circumferential surface of the U-turn roller 44 and serves as a guide surface that guides upward a leading edge of the document conveyed leftward from the lower end of the U-turn roller 44.

The document is conveyed along the first conveying path while being guided upward along the guide surface and making a U-turn along the U-turn roller 44. The document conveyed along the first conveying path is discharged on the top of the document conveying unit 4, i.e., on the upper sides of the partition plates.

When the second conveying path is selected (as shown in FIG. 4B) as the document conveying path, the path switching member 45 pivots leftward about a lower end thereof such that the right and left spaces of the path switching member 45 communicate with each other. A leading edge of the document conveyed leftward from the lower end of the U-turn roller 44 passes over an upper end of the path switching member 45. The width of the communicating spaces in the front-rear direction may be set such that the document having a predetermined size (e.g., a postcard size) passes along the second conveying path.

Consequently, the document is conveyed straight toward the link member 46 along the second conveying path. Then, the document is discharged from the second opening 4A formed at a left end of the document conveying unit 4 and is supported from left and below by the cover member 5 that serves as a discharge tray.

Further, the multi-function device 1 is configured to scan a stationary document placed on the transparent portion 25. In this case, the document conveying unit 4 is opened and a document is placed on a document holding surface, e.g., the transparent portion 25. In this state, a scanning command is input to the multi-function device 1 through the operation panel 7 or remotely from the personal computer.

When a scanning command is input to the multi-function device 1, the multi-function device 1 executes initialization of each device and then the first image sensor 2 scans an image of the document. Specifically, the first image sensor 1 scans an image of the document placed on the transparent portion 25 by repeatedly scan a plurality of pixels arranged on the document in the main scanning direction while moving in the sub-scanning direction.

An open/closed state detecting mechanism will now be described. As shown in FIGS. 5 to 8, the multi-function device 1 comprises, as the open/closed state detecting mechanism, a first detector 51, a first movable member 53, a first moving mechanism 55, a second detector 61, a second movable member 63, and a second moving mechanism 65. The open/closed state detecting mechanism is disposed near a left front corner of the multi-function device 1.

The first detector 51 and the second detector 61 are disposed in the main unit 2, and the first movable member 53 and the second movable member 63 are disposed in the scanning unit 3. A part of each of the first moving mechanism 55 and the second moving mechanism 65 is disposed in the scanning unit 3, and the remaining part 5 of each of the first moving mechanism 55 and the second moving mechanism 65 is disposed in the document conveying unit 4.

The first detector 51 comprises a first switch 51A, a coil spring 51B, and a lifting member 51C. The lifting member 51C is supported by the main unit 2 so as to move in the top-bottom direction and is urged upward by the coil spring 51B. The first switch 51A turns off when the lifting member 51C moves up to be separated from the first switch 51A and turns on when the lifting member 51C moves down to contact the first switch 51A.

The first movable member 53 is supported by the scanning unit 3 movably in the top-bottom direction. The first moving mechanism 55 is configured to move up and down the first movable member 53 in response to opening/closing of the cover member 5 and comprises a first urging portion 55A, a responsive portion 55B, and a contacting portion 55C.

The first urging portion 55A comprises a coil spring. The first movable member 53 is urged downward by the first urging portion 55A. The responsive portion 55B is supported by the scanning unit 3 oscillatably about an axis located at a central portion in the front-rear direction of the responsive portion 55B and extending in the left-right direction.

The first movable member 53 is in contact with a front end of the responsive portion 55B. When the first movable member 53 is urged downward by the first urging portion 55A to move down, the front end of the responsive portion 55B moves down, too. On the other hand, when a rear end of the responsive portion 55B moves down, the front end of the responsive portion 55B moves up, and the first movable member 53 moves up, against the urging force of the first urging portion 55A, together with the front end of the responsive portion 55B The second detector 61 comprises a second switch 61A, a coil spring 61B, and a lifting member 61C. The lifting member 61C is supported by the main unit 2 movably in the top-bottom direction and is urged upward by the coil spring 61B. The second switch 61A turns off when the lifting member 61C moves up to be separated from the second switch 61A and turns on when the lifting member 61C moves down to contact the second switch 61A.

The second movable member 63 is supported by the scanning unit 3 movably in the top-bottom direction. The second moving mechanism 65 is configured to move up and down the second movable member 53 in response to opening/closing of the document conveying unit 4 and comprises a second urging portion 65A and a pressing portion 65B.

The second urging portion 65A comprises a coil spring. The second movable member 63 is urged upward by the second urging portion 65A. When the pressing portion 65B is separated from an upper end of the second movable member 63, the second movable member 63 is urged by the second urging portion 65A to move up. On the other hand, when the upper end of the second movable member 63 is pressed by the pressing portion 65B, the second movable member 63 moves down against the urging force of the second urging portion 65A.

The open/closed state detecting mechanism having the above-described structure functions as described below. As shown in FIGS. 5A and 5B, when the scanning unit 3, the document conveying unit 4, and the cover member 5 are all in the closed positions (when the multi-function device 1 is in a first open/closed state), the first movable member 53 is urged by the first urging portion 55A and moves down to press down the lifting member 51C.

Although the lifting member 51C is urged upward by the coil spring 51B, the urging force of the coil spring 51B is set to be smaller than the urging force of the first urging portion 55A. Thus, the lifting member 51C moves down to turn on the first switch 51A. The second movable member 63 is pressed by the pressing portion 65B to move down and presses down the lifting member 61C. The lifting member 61C moves down to turn on the second switch 61A. In short, when the scanning unit 3, the document conveying unit 4, and the cover member 5 are all in the closed positions, both of the first switch 51A and the second switch 61A turn on.

As shown in FIGS. 6A and 6B, when the scanning unit 3 and the document conveying unit 4 are in the closed position but the cover member 5 is in the open position (when the multi-function device 1 is in a second open/closed state), the contacting portion 55C oscillates the responsive portion 55B, and the front end of the responsive portion 55B moves up. Consequently, the first movable member 53 moves up, against the urging force of the first urging portion 55A, together with the front end of the responsive portion 55B.

Because the lifting member 51C is urged upward by the coil spring 51B, the lifting member 51C moves up to follow the first movable member 53 and turns off the first switch 61A. The second movable member 63 is pressed down by the pressing portion 65B and presses down the lifting member 61C. The lifting member 61C moves down to turn on the second switch 61A. In short, when the scanning unit 3 and the document conveying unit 4 are in the closed positions but the cover member 5 is in the open position, the first switch 61A turns off and the second switch turns on.

As shown in FIGS. 7A and 7B, when the scanning unit 3 is in the closed position but the document conveying unit 4 is in the open position (when the multi-function device 1 is in a third open/closed state), the first movable member 53 is urged by the first urging portion 55A to move down and presses down the lifting member 51C. As already described, because the urging force of the coil spring 51B is set to be smaller than the urging force of the first urging portion 55A, the lifting member 51C moves down to turn on the first switch 51A.

Because the pressing portion 65B is separated from the second movable member 63, the second movable member 63 is urged by the second urging portion 65A to move up. Because the lifting portion 61C is urged upward by the coil spring 61B, the lifting member 61C moves up to follow the second movable member 63 and turns off the second switch 61A. In short, when the scanning unit 3 is in the closed position but the document conveying unit 4 is in the open position, the first switch 51A turns on and the second switch 61A turns off. The first switch 51A maintains on and the second switch 61A maintains off irrespective of whether the cover member 5 is opened or closed relative to the document conveying unit 4 which is in the open position.

As shown in FIGS. 8A and 8B, when the scanning unit 3 is in the open position (when the multi-function device 1 is in a fourth open/closed state), the first movable member 53 and the second movable member 63 are separated from the lifting member 51C and the lifting member 61C, respectively. The lifting members 51C, 61C are urged upward by the coil springs 51B, 61B, respectively to move up and turn off the first switch 51A and the second switch, respectively. In short, when the scanning unit 3 is in the open position, both of the first switch 51A and the second switch 61A turn off. The first switch 51A and the second switch 61A maintain off irrespective of whether the document conveying unit 4 is opened or closed relative to the scanning unit 3 which is in the open position, and irrespective of whether the cover member 5 is opened or closed relative to the document conveying unit closed relative to the scanning unit 3 which is in the open position.

As describe above, the four open/closed states of the scanning unit 3, the document conveying unit 4, and the cover member 5 can be detected with the two switches, i.e., the first switch 51A and the second switch 61A, based on the on/off states of the first switch 1A and the second switch.

In other words, the first detector 51 and the second detector 61 output four different combinations of on/off signals depending on the positions of the scanning unit 3, the document conveying unit 4, and the cover member 5. One of the four different combinations indicates that all of the scanning unit 3, the document conveying unit 4, and the cover member 5 are in the closed positions. Another one of the four different combinations indicates that the scanning unit 3 is in the open position. Still another one of the four different combinations indicates that the document conveying unit 4 is in the open position. Yet another one of the four different combinations indicates that the cover member 5 is in the open position.

An example of control executed according to the open/closed states detected by the open/closed detecting mechanism will now be described based on a flowchart shown in FIG. 9. An ADF scanning process, which will be described below, is a process executed for scanning an image of a document while the document conveying unit 4 conveys the document.

When this process starts, the multi-function device 1 first determines whether the second switch 61A is on in step 10 (S10). When it is determined that the second switch 61A is on (S10: YES), the multi-function device 1 determines whether the first switch is on in step 20 (S20). When it is determined that the first switch is on (S20: YES), it is determined that the multi-function device 1 is in the first open/closed state shown in FIGS. 5A and 5B.

Subsequently, the multi-function device 1 determines whether a document is smaller than or equal to the predetermined size in step 30 (S30). This determination is made based on detection by the document sensor 17 of the multi-function device 1. When it is determined that the document is not smaller than or equal to the predetermined size in step 30 (S30: NO), scanning of an image of the document is executed using the first conveying path in step 40 (S40). Then, the ADF scanning process ends. Although necessary operation conditions are checked further in step 40 (S40), this kind of image scanning is known and unrelated to the subject matter of the invention, and thus further description will be omitted.

When it is determined that the document is smaller than or equal to the predetermined size in step 30 (S30: YES), the multi-function device 1 outputs an error message that the cover member 5 is closed in step 50 (S50), and the process returns to step 10 (S10). When the cover member 5 is opened by the user in response to the error massage, the open state of the cover member 5 becomes detectable. When the cover member 5 is not opened by the user even after steps 10 to 50 are repeated by a predetermined number of times, the ADF scanning process ends because of a timeout. When the document is smaller than or equal to the predetermined size, it is required to use the second conveying path in the multi-function device 1 and, in this case, the cover member 5 must be open. Thus, the error message is output in step 50 and image scanning is not executed.

When it is determined that the first switch 51A is off in step 20 (S20: NO), it is determined that the multi-function device 1 is in the second open/closed state shown in FIGS. 6A and 6B.

In this case, the multi-function device 1 determines whether a document is smaller than or equal to the predetermined size in step 60 (S60). When it is determined that the document is smaller than or equal to the predetermined size in step 60 (S60: YES), scanning of an image of the document is executed using the second conveying path in step 70 (S70). Then, the ADF scanning process ends. Although necessary operation conditions are checked further in step 70 (S70), this kind of image scanning is known and unrelated to the subject matter of the invention, and thus further description will be omitted.

When it is determined that the document is not smaller than or equal to the predetermined size in step 60 (S60: NO), the multi-function device 1 outputs an error message that the cover member 5 is open in step 80 (S80), and the process returns to step 10 (S10). When the cover member 5 is closed by the user in response to the error massage, the closed state of the cover member 5 becomes detectable. When the cover member 5 is not closed by the user even after steps 10 to 80 are repeated by a predetermined number of times, the ADF scanning process ends because of a timeout. When the document is larger than the predetermined size, it is required to use the first conveying path in the multi-function device 1 and, in this case, the cover member 5 must be closed. Thus, the error message is output in step 80 and image scanning is not executed.

When it is determined that the second switch 61A is off in step 10 (S10: NO), the multi-function device 1 determines whether the first switch 51A is on in step 90 (S90). When it is determined that the first switch 51A is on (S90: YES), it is determined that the multi-function device 1 is in the third open/closed state shown in FIGS. 7A and 7B. In this case, the multi-function device 1 outputs an error message that the document conveying unit 4 is open in step 100 (S100), and the process returns to step 10 (S10). When the document conveying unit 4 is closed by the user in response to the error message, the closed state of the conveying unit 4 becomes detectable. When the document conveying unit 4 is not closed by the user even after steps 10 to 110 are repeated by a predetermined number of times, the ADF scanning process ends because of a timeout. When the document conveying unit 4 is open, image scanning cannot be executed properly. Thus, the error message is output in step 100 and image scanning is not executed.

When it is determined that the first switch 51A is off (S90: NO), it is determined that the multi-function device 1 is in the fourth open/closed state shown in FIGS. 8A and 8B. In this case, the multi-function device 1 outputs an error message that the scanning unit 3 is open in step 110 (S110), and the process returns to step 10 (S10). When the scanning unit 3 is closed by the user in response to the error message, the closed state of the scanning unit 3 becomes detectable. When the scanning unit 3 is not closed by the user even after steps 10 to 110 are repeated by a predetermined number of times, the ADF scanning process ends because of a timeout. When the scanning unit 3 is open, image scanning cannot be executed properly. Thus, the error message is output in step 110 and image scanning is not executed.

In this embodiment, if the document is set on the document holder 12 when a scanning command is input to the multi-function device 1, the above-described ADF scanning is executed. However, in another embodiment, whether to use the document conveying unit 4 may be designated when the scanning command is input to the multi-function device 1.

As described above, in the multi-function device 1 according to the above-described embodiment, the four open/closed states of the three objects, i.e., the scanning unit 3, the document conveying unit 4, and the cover member 5, are detected using the two switches, i.e., the first switch 51A and the second switch 61A.

Thus, as compared to the technology where open/closed states of three objects are detected using three separate switches/sensors, the total number of switches/sensors can be reduced, and the device size is reduced by saving the space for the switches/sensors. Further, the manufacturing cost can be reduced because the parts cost and the assembly man-hour can be reduced in correspondence to the reduced switches/sensors.

In the multi-function device 1, it is determined whether the scanning unit 3, which is a first priory object to be detected, is open or closed, whether the document conveying unit 4, which is a second priority object to be detected, is open or closed when the scanning unit 3 is closed, and whether the cover member 5, which is a third priority object to be detected, is open or closed when the document conveying unit 4 is closed.

Thus, as compared to the technology where it is determined whether any of a plurality of objects is open or all of the objects are closed, a more detailed determination as to which object is open is made. Based on the more detailed determination, an error message is output to indicate the open/closed state of a particular object, as described above about steps 50, 80, 100, and 110. Such error message allows the user to operate the device more appropriately as compared to the case where an error message that any of the objects is open is output.

Although, in the above-described embodiment, the first detector 1 and the second detector 2 are disposed in the main unit 2, the first detector 51 comprising the first switch 51A and the second detector 61 comprising the second switch 61A may be disposed in the scanning unit 3 or the document conveying unit 4. In this case, an on/off switching mechanism similar to that in the above-described embodiment is obtained by appropriately disposing a movable portion for turning on/off a switch, an urging portion, and a responsive portion for conveying motion to a remote location, and the like.

Although, in the above-described embodiment, the first switch 51A and the second switch 61A turn on/off in a particular manner, one or both of the first switch 51A and the second switch 61A may turn on/off in an opposite manner.

In the above-described embodiment, the open/closed states of the scanning unit 3, the document conveying unit 4, and the cover member 5 are detected while giving the first priority to the scanning unit 3, the second priority to the document conveying unit 4, and the third priority to the cover member 5. In other words, in the above-described embodiment, the scanning unit 3 which is open is detected as the first priority object, and the cover member 5 which is closed is detected as the last priority object. However, the priority of detection may be changed.

In the above-described embodiment, the cover member 5 is connected to the path switching member 45 such that the path switching member 45 moves between the first position and the second position as the cover member 5 moves between the closed position and the open position. However, the cover member 5 may not be connected to the path switching member 45. In this case, the multi-function device 1 may be configured to determine whether to able to execute a particular function by detecting the position of the path switching member 5, instead of the position of the cover member 5.

If the first switch 51A and the second switch 51B can be disposed in upper positions in the scanning unit 3, the coil spring 51B and the lifting member 51C, and the coil spring 61B and the lifting member 61C may be omitted.

Although, in the above-described embodiment, the image scanning device is configured to be a multi-function device, the image scanning device is not limited to a multi-function device.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image scanning device comprising:
    a main unit;
    a scanning unit comprising a document holding surface and configured to scan a document held on the document holding surface and to move relative to the main unit between a first base position and a first moved position;
    a document conveying unit configured to covey the document to be scanned by the scanning unit and to move relative to the scanning unit between a second base position and a second moved position;
    a cover member configured to move relative to the document conveying unit between a third base position and a third moved position;
    a first detector configured to output an on/off signal; and
    a second detector configured to output an on/off signal,
    wherein the first detector and the second detector are configured to output four different combinations of on/off signals including:
        a first combination of on/off signals output when the scanning unit, the document conveying unit, and the cover member are in the first base position, the second base position, and the third base position, respectively;
        a second combination of on/off signals output when the scanning unit moves from the first base position to the first moved position while the document conveying unit and the cover member are in the second base position and the third base position, respectively;
        a third combination of on/off signals output when the document conveying unit moves from the second base position to the second moved position while the scanning unit and the cover member are in the first base position and the third base position, respectively; and
        a fourth combination of on/off signals output when the cover member moves from the third base position to the third moved position while the scanning unit and the document conveying unit are in the first base position and the second base position, respectively.

2. The image scanning device according to claim 1, wherein the first detector and the second detector are configured to maintain outputting the third combination of on/off signals when the document conveying unit is in the second moved position, irrespective of whether the cover member moves between the third base position and the third moved position.

3. The image scanning device according to claim 1, wherein the first detector and the second detector are configured to maintain outputting the second combination of on/off signals when the scanning unit is in the first moved position, irrespective of whether the document conveying unit moves between the second base position and the second moved position.

4. The image scanning device according to claim 1, wherein the first detector and the second detector are configured to maintain outputting the second combination of on/off signals when the scanning unit is in the first moved position, irrespective of whether the cover member moves between the third base position and the third moved position.

5. The image scanning device according to claim 1, wherein when the scanning unit moves from the first base position to the first moved position, the first detector is configured to change from outputting one of on and off signals to outputting the other of the on and off signals, and the second detector is configured to change from outputting one of on and off signals to outputting the other of the on and off signals.

6. The image scanning device according to claim 1, wherein the first detector and the second detector are disposed in the main unit.

7. The image scanning device according to claim 1, further comprising a first movable member disposed in the scanning unit, wherein when the scanning unit moves from the first base position to the first moved position or when the cover member moves from the third base position to the third moved position, the first movable member is configured to move such that the first detector changes from outputting one of on and off signals to outputting the other of the on and off signals.

8. The image scanning device according to claim 1, further comprising a second movable member disposed in the scanning unit, wherein when the scanning unit moves from the first base position to the first moved position or when the document conveying unit moves from the second base position to the second moved position, the second movable member is configured to move such that the second detector changes from outputting one of on and off signals to outputting the other of the on and off signals.

9. The image scanning device according to claim 1, wherein an inside of the main unit is exposed when the scanning unit is in the first moved position.

10. The image scanning device according to claim 1, wherein the document holding surface of the scanning unit is exposed when the document conveying unit is in the second moved position.

11. The image scanning device according to claim 1, wherein the document conveying unit is configured to discharge the document onto the cover member when the cover member is in the third moved position.

12. The image scanning device according to claim 1, further comprising an alarming unit configured to determine positions of the scanning unit, the document conveying unit, and the cover member, based on output signals from the first detector and the second detector, and to output an alarm when the determined positions differ from predetermined positions required for the image scanning device to perform a predetermined function.

13. An image scanning device comprising:
    a main unit;
    a scanning unit comprising a document holding surface and configured to scan a document held on the document holding surface and to move relative to the main unit between a first base position and a first moved position;
    a document conveying unit configured to covey the document to be scanned by the scanning unit and to move relative to the scanning unit between a second base position and a second moved position;
    a path switching member configured to guide the document conveyed by the document conveying unit and to move between a first position for guiding the document along a first path and a second position for guiding the document along a second path;
    a first detector configured to output an on/off signal; and
    a second detector configured to output an on/off signal, wherein the first detector and the second detector are configured to output four different combinations of on/off signals including:

a first combination of on/off signals output when the scanning unit, the document conveying unit, and the path switching member are in the first base position, the second base position, and the first position, respectively;

a second combination of on/off signals output when the scanning unit moves from the first base position to the first moved position while the document conveying unit and the path switching member are in the second base position and the first position, respectively;

a third combination of on/off signals output when the document conveying unit moves from the second base position to the second moved position while the scanning unit and the path switching member are in the first base position and the first position, respectively; and a fourth combination of on/off signals output when the path switching member moves from the first position to the second position while the scanning unit and the document conveying unit are in the first base position and the second base position, respectively.

14. The image scanning device according to claim 13, further comprising a cover member connected to the path switching member such that the cover member moves relative to the document conveying device as the path switching member moves between the first position and the second position.

15. The image scanning device according to claim 13, wherein the document conveying unit is configured to convey the document along the first path which is a U-turn path when the path switching member is in the first position, and along the second path which is a straight path when the path switching member is in the second position.

* * * * *